Sept. 20, 1932.  C. F. BURDETT ET AL  1,878,818
GLASS CUTTING EQUIPMENT
Filed Jan. 21, 1930  2 Sheets-Sheet 2

INVENTORS
C. F. Burdett
Wm Owen
J. L. Bradley

Patented Sept. 20, 1932

1,878,818

UNITED STATES PATENT OFFICE

CLARENCE FREDRICK BURDETT, OF FORD CITY, AND WILLIAM OWEN, OF PITTSBURGH, PENNSYLVANIA, ASSIGNORS TO PITTSBURGH PLATE GLASS COMPANY, A CORPORATION OF PENNSYLVANIA

GLASS CUTTING EQUIPMENT

Application filed January 21, 1930. Serial No. 422,457.

Figure 1:
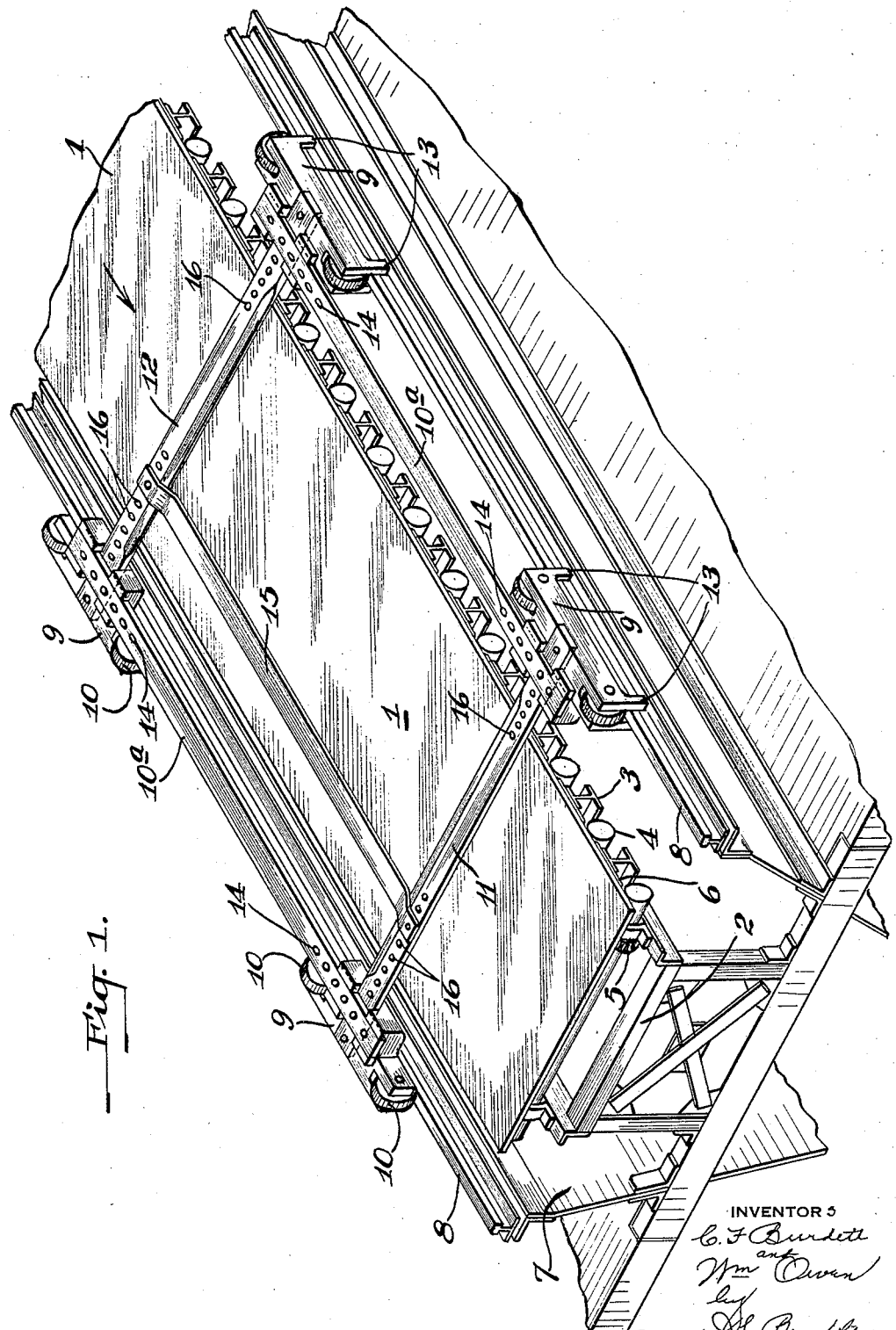
Figure 2:
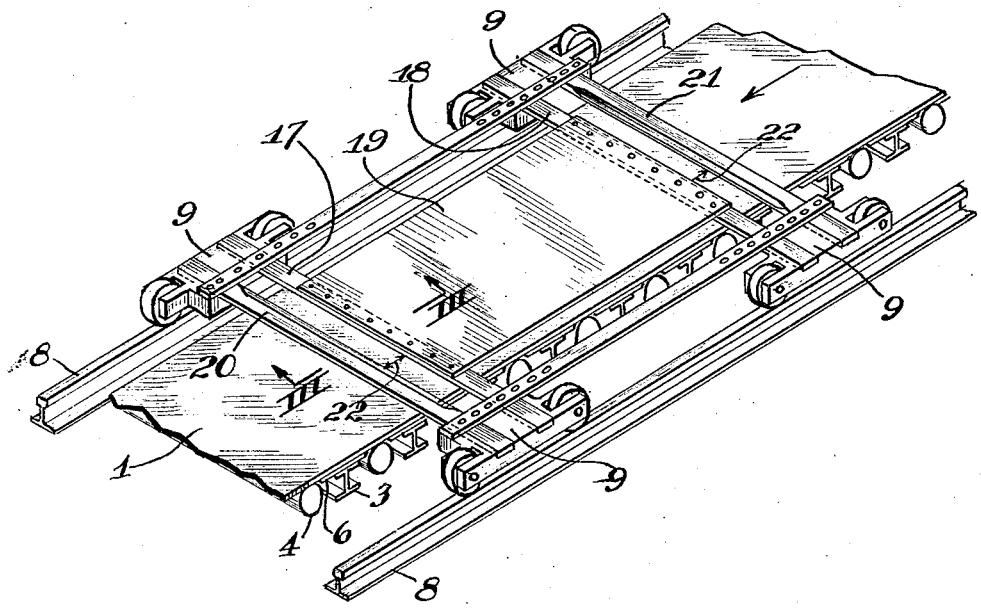
Figure 3:
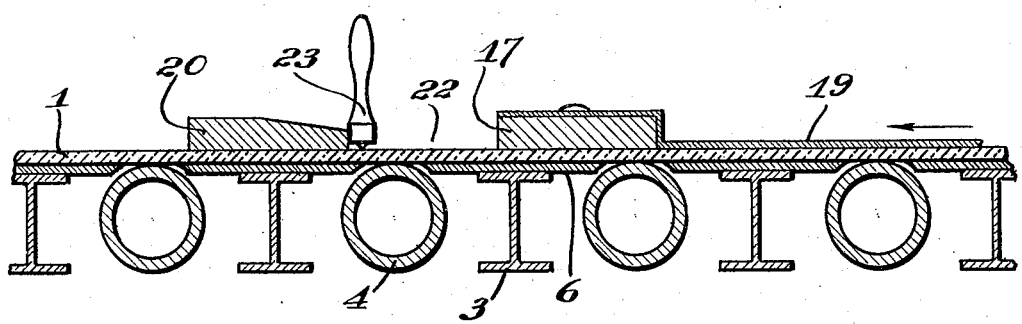

The invention relates to glass cutting equipment employed in cutting off sections of a glass sheet as it emerges from a horizontal leer and is carried ahead on its roller bed. The sheet which is cut may be either one of a series, such as those formed in an intermittent casting operation, or may be one formed continuously from a tank. The main objects of the invention are the provision of an improved cutter guide or frame which can be used to advantage in a hand cutting operation and which is of cheap, simple construction easily applied to the outlet end of any leer and easily operated. A further object is the provision of a device of the character specified in which the construction provides a guide in determining the length of the sections into which the sheet is divided. Certain embodiments of the invention are illustrated in the accompanying drawings, wherein:

Figure 1 is an isometric view showing one embodiment of the invention as applied to the cutting table at the outlet end of the roller leer. Fig. 2 is a view similar to that of Fig. 1, but showing a modification. And Fig. 3 is a section on the line III—III of Fig. 2.

Referring to Fig. 1, 1 is a sheet of plate glass formed and annealed by suitable apparatus and moving in the direction of the arrows upon the cutting table. This cutting table consists of a framework 2 carrying the transverse I-beams 3 between which are the series of rollers 4, such rollers being driven in any suitable way, such as by a chain passing around sprockets 5 secured to the rolls. Plates 6 are provided on the I-beams 3 and extend relatively close to the rolls, as indicated in Fig. 3, so that the glass is supported against breaking when the operator stands upon it for the purpose of cutting it.

Extending along each side of the framework 2 is a cullet hopper 7 carrying upon its upper edge a rail 8, such rail serving as a track for carrying the cutting frame to which the invention particularly relates. This cutting frame comprises the four members 9, 9, 9, 9, each provided with a pair of wheels 10 engaging the rails and the rectangular frame made up of the side bars 10ª, 10ª and the two straight edges 11, 12 extending transversely of the cutting table. Guide clips 13 are provided upon the members 9, 9, 9, 9 projecting down alongside of the rails and serving to keep the cutting frame upon its track. The ends of the side bars 10ª, 10ª are mounted slidably in the members 9, 9, 9, 9 so that the distance between the straight edges 11, 12 may be adjusted to suit conditions, the side bars being provided with a plurality of holes 14 for the passage of bolts which serve to secure the side bars and straight edges to the members 9. A longitudinal straight edge 15 is also provided extending between the straight edges 11 and 12 and serving as a guide when it is desirable to make a cut longitudinally of the sheet. This straight edge is adjustable laterally on the straight edges 11, 12 by reason of the plurality of holes 16 in the straight edges and similar holes in the ends of the straight edge 15 for the reception of suitable securing means, such as bolts. The straight edges 11 and 12 lie very close to the glass and may even touch it lightly. They are preferably in the form of relatively thin strips, either of wood or metal which can be easily pressed down against the glass.

The operator may stand at the side of the table and score the glass with a diamond or wheel along the straight edge, but ordinarily he stands upon the glass sheet intermediate the two straight edges and performs the cutting operation. The frame must at this time move along with the glass and to insure this movement, the straight edge along which the cut is being made will be pressed down against the glass, thus causing the frame to move along with the glass. It is possible for the cutter to press down the bar and also cut at the same time, but ordinarily the straight edge is pressed down by another operator standing at the side of the table; thus leaving the cutter free to devote his entire attention to making the transverse cut. The straight edge 11 is utilized to cut off the front edge of the sheet 1 which is ordinarily rounded and somewhat rough. After this end is cut off, a second cut is made along the straight edge 12. This gives a section of the desired length, the straight edges 11 and 12 being spaced apart a distance corresponding to the desired length of section. In making the next cut following the two just referred to, the straight edge 11 is placed even with the forward end of the sheet which is to be cut, the straight edge 12 is pressed down against the glass sheet and another cut made along its edge. This procedure is followed until the entire sheet is cut into sections, the position of the straight edge 11 with respect to the straight edge 12 serving as a guide to fix the length of the section in each case. In practice, the length of the sections is ten feet. The straight edge 15 may be used when it is desired to trim off the edges of the sheet or when it is desired to cut the sheet longitudinally at some point intermediate its edges.

Figs. 2 and 3 illustrate a modification which in all essentials is the same as that described in connection with Fig. 1 except that a pair of additional transverse bars 17, 18 are provided extending between the members 9, 9 and such bars serve as the support for a plate 19 preferably of sheet steel or aluminum. This plate serves as a support for the operator in cutting the sheet transversely along the straight edges 20 and 21. As indicated in Fig. 3, the straight edges 20 and 21 are spaced away from the transverse bars 17 and 18 so as to provide the spaces 22 in which the cutter can place the cutting off tool 23 for movement along the straight edge. The advantage of this construction resides in the fact that it is not necessary for the operator to press the straight edges 20 or 21 down against the glass sheet in order to secure a movement of the cutting frame with the glass, since his weight upon the plate 19 serves to clamp the cutting frame to the glass. It is thus very easy for one operator to attend to the entire cutting operation and no assistant is called for in order to hold the straight edges 20 and 21 down against the glass during the scoring operation. Here as in the construction of Fig. 1, the straight edges 20 and 21 are placed apart a distance equal to the length of sections which are to be cut from the sheet.

What we claim is:

1. In combination in glass cutting apparatus, a carrier for moving the glass sheet forward, a track paralleling the line of movement of the glass and a rectangular frame mounted on the track and including a straight edge extending across the glass and relatively flexible so that it may be pressed down against the glass and move along therewith during the scoring of the glass.

2. In combination in glass cutting apparatus, a carrier for moving the glass sheet forward, a track paralleling the line of movement of the glass and a rectangular frame mounted on the track and including a straight edge at one end of the frame extending across the glass sheet, and a flexible support for the operator lying between the straight edge and the other end of the frame and adapted to engage the glass and cause the frame to move with the glass when the weight of the operator is imposed upon said support.

3. In combination in glass cutting apparatus, a carrier for moving the glass sheet forward, a track paralleling the line of movement of the glass and a rectangular frame mounted on the track and including a pair of straight edges at the ends of the frame extending across the glass sheet, and a flexible support for the operator lying between the straight edges and adapted to engage the glass and cause the frame to move with the glass when the weight of the operator is imposed upon said support, said straight edges being spaced apart the length of the sections which are to be cut from the sheet.

In testimony whereof, we have hereunto subscribed our names.

CLARENCE FREDRICK BURDETT.
WILLIAM OWEN.